(12) United States Patent
Shiraki et al.

(10) Patent No.: US 6,389,296 B1
(45) Date of Patent: May 14, 2002

(54) TRANSMISSION POWER CONTROL METHOD

(75) Inventors: Yuichi Shiraki; Chiharu Yamano, both of Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/166,847

(22) Filed: Oct. 6, 1998

(30) Foreign Application Priority Data

Oct. 8, 1997 (JP) .............................................. 9-275367
Oct. 8, 1997 (JP) .............................................. 9-275369
Oct. 8, 1997 (JP) .............................................. 9-275371

(51) Int. Cl.$^7$ ................................................ H04B 7/26
(52) U.S. Cl. .......................... 455/522; 455/69; 370/335
(58) Field of Search ........................... 455/69, 522, 63; 370/335; 375/345

(56) References Cited

U.S. PATENT DOCUMENTS 5,455,964 A * 10/1995 Roos et al. .................... 455/69
5,604,766 A * 2/1997 Dohi et al. .................. 370/335

* cited by examiner

*Primary Examiner*—Lee Nguyen
(74) *Attorney, Agent, or Firm*—Rabin & Berdo, P.C.

(57) ABSTRACT

A base station transmits, to a mobile station, a transmission power control instruction signal for controlling the transmission power of the mobile station, along with a transmission signal, at regular periods, based on a received power of a signal transmitted by the mobile station. The mobile station at its transmission power control bit monitor monitors the transmission power control instruction signal transmitted by the base station and changes the rate of modification in the transmission power in a step size determining unit, based on either the number of consecutive transmission power control instruction signals that give the same content or the number of consecutive transmission power control instruction signals that give different contents, one from another. The mobile station in its transmission power amplifier gain controller controls the transmission power of a signal to be transmitted, based on the transmission power control instruction signal transmitted by the base station and the changed rate of modification in the transmission power.

25 Claims, 5 Drawing Sheets

TRANSMISSION POWER CONTROL METHOD

BACKGROUND OF THE INVENTION

1. Field of the Invention

The present invention relates to a transmission power control method for a mobile telephone communication, particularly in a code division multiple access (CDMA) system.

2. Description of the Related Art

CDMA technique is described in the literature titled "CDMA Principles of Spread Spectrum Communication" authored by Andrew J. Viterbi, and published Addison Wesley Publishing Company.

CDMA, mobile stations use a carrier frequency in the same frequency band, and the transmission signal from each mobile station is identified by a spreading code uniquely assigned to each mobile station.

Figure 2:
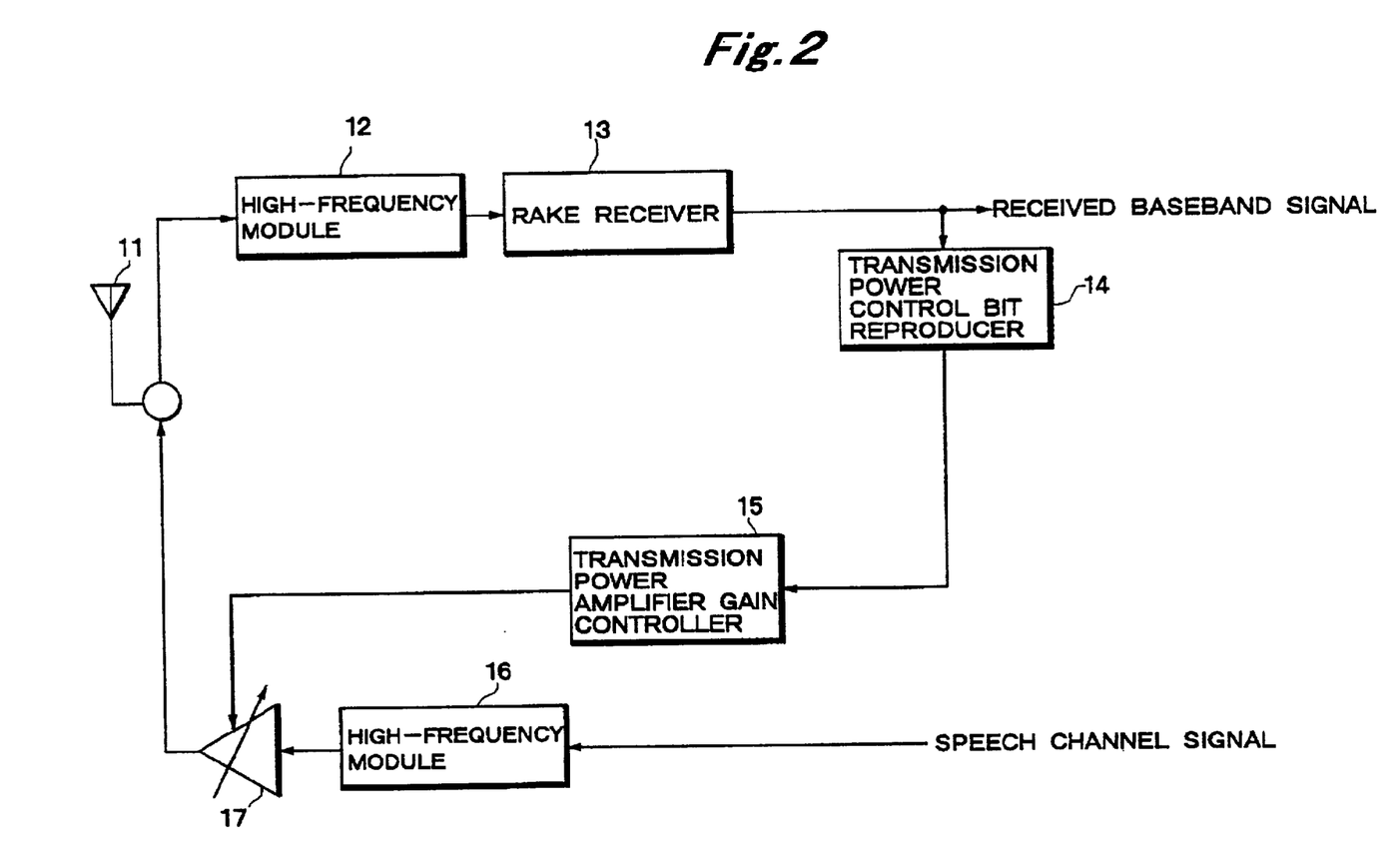
FIG. 2 illustrates a conventional transmission power control method.

FIG. 2 shows the construction of a mobile station that works in a conventional transmission power control method.

FIG. 2, shows a transmitting/receiving antenna 11, a high-frequency module 12 for converting a signal received from a base station into a signal in a spread band; a rake receiver 13 for decoding the output signal of the high-frequency module 12 into a baseband signal, a transmission power control bit reproducer 14 for extracting a transmission power control bit which is sent by the base station at regular periods, a transmission power amplifier gain controller 15 for controlling the gain of a power amplifier, a high-frequency module 16 for converting a speech channel signal into a radio-frequency band signal, and the variable-gain amplifier 17 for amplifying the output signal of the high-frequency module 16 to transmit the amplified signal from the transmitting/receiving antenna 11. The gain of the variable-gain amplifier 17 is controlled by the transmission power amplifier gain controller 15.

To assure the quality of communication to all mobile stations and to treat all mobile stations the same, the base station needs to have received powers at equal level from the mobile stations. The power of a signal received from a mobile station is subject to variations (fading) along with the movement of the mobile station.

In the conventional mobile station shown in FIG. 2, a base station reports to the mobile station that the received power is insufficient, and the mobile station adjusts its transmission power in accordance with the report. This control is thus a closed-loop transmission power control. The transmission power control is also provided with an open-loop control capability in which the mobile station automatically controls its transmission power with no instruction received from the base station.

The operation of a conventional mobile station is discussed.

The base station monitors the received power of a signal transmitted by the mobile station for a constant segment of time (Tpc (seconds)). The base station issues an instruction signal of 1 bit (transmission power control bit) for lowering the transmission power of the mobile station by a certain percentage if the average power during the constant segment is greater than a predetermined value, and issues an instruction signal of 1 bit (transmission power control bit) for raising the transmission power of the mobile station by a certain percentage when the average power during the constant segment is smaller than the predetermined value. These signals are transmitted to the mobile station over a downlink speech channel (from the base station to the mobile station) at every predetermined time segment (Tpc (seconds)).

The mobile station demodulates the received signal at its rake receiver 13, extracts, at its transmission power control bit reproducer 14, the transmission power control bit at every constant time period of segment from the demodulated signal from the rake receiver 13, and outputs the transmission power control bit to its transmission power amplifier gain controller 15. The transmission power amplifier gain controller 15 controls the variable-gain amplifier 17 in order to raise the transmission power by a certain percentage when the transmission power control bit indicates an instruction to increase power, or in order to lower the transmission power by a certain percentage when the transmission control bit indicates an instruction to reduce power.

In the conventional transmission power control method, the rate of increase or decrease in the transmission power of the mobile station is constant (the rate of increase or reduction in the transmission power is now called a step size in the transmission power control), regardless of the varying rate of change over time in the received power with the mobile station moving at some travel speed or under the occurrence of fading. For example, when a large increase is required in the transmission power, no matching rate of increase results. With the mobile station moving at a high travel speed, a variation in the transmission power of a signal received from the mobile station becomes abrupt, and the base station suffers a large error from a desired value in the received signal level.

SUMMARY OF THE INVENTION

According a first aspect, the present invention relates to the transmission power control method in a radio communications system for communication between a base station and a mobile station, wherein the base station detects the power of a received signal transmitted by the mobile station and in return transmits, to the mobile station, a transmission power control instruction signal for controlling the transmission power of the mobile station, along with a transmission signal, at regular periods; the mobile station monitors the transmission power control instruction signal transmitted by the base station and changes the rate of modification in the transmission power, based on either a setting of the number of consecutive transmission power control instruction signals that give the same content or a setting of the number of consecutive transmission power control instruction signals that give different contents; and the mobile station controls the transmission power of a signal to be transmitted, based on the transmission power control instruction signal transmitted by the base station and the changed rate of modification in the transmission power.

According to a second aspect, the present invention relates to a transmission power control method in a radio communications system for communication between a base station and a mobile station, wherein the base station detects the power of a received signal transmitted by the mobile station and in return transmits, to the mobile station, a transmission power control instruction signal for controlling the transmission power of the mobile station, along with a transmission signal, at regular periods; the mobile station estimates the transmission power control instruction signal, based on the transmission power control instruction signal transmitted by the base station and a current rate of modification in the transmission power; the mobile station monitors the estimated transmission power control instruction signal and changes the rate of modification in the transmission power, based on either a setting of the number of consecutive transmission power control instruction signals that give the same content or a setting of the number of consecutive transmission power control instruction signals that give different contents, and the mobile station controls the transmission power of a signal to be transmitted, based on the transmission power control instruction signal transmitted by the base station and the changed rate of modification in the transmission power.

According to a third aspect, the present invention relates to a transmission power control method in a radio communications system for communication between a base station and a mobile station, wherein the base station detects a received power of a signal transmitted by the mobile station and transmits, to the mobile station, a transmission power control instruction signal for controlling the transmission power of the mobile station, along with a transmission signal, at regular periods; the mobile station estimates a Doppler frequency to which the received signal is subject to under fading, based on the transmission power control instruction signal transmitted by the base station and a current rate of modification in the transmission power; the mobile station changes a rate of modification in the transmission power, based on the estimated Doppler frequency and the transmission power control instruction signal; and the mobile station controls the transmission power of a signal to be transmitted, based on the transmission power control instruction signal transmitted by the base station and the changed rate of modification in the transmission power.

DESCRIPTION OF THE PREFERRED EMBODIMENTS

In the basic principle in a first aspect of the present invention, a step size in the transmission power control is appropriately modified to achieve a better tracking performance of fading.

Available as a method for varying the step size appropriately is a Jayant method that is used in the adaptive delta modulation in the field of voice encoding as detailed in a book titled "Digital Processing of Speech Signals" authored by L. R. Rabiner and R. W. Schafer, and published by Prentice-Hall, Inc.

The transmission power control using this method is first discussed.

Let $C(n)$ represent the instruction of transmission power control received from a base station at a period of transmission power control (n-th period, for example), namely 1-bit information for power increase or power decreases (for convenience, $-1$ represents transmission power increase while $+1$ represents transmission power reduction), $C(n-1)$ represent the instruction information of the transmission power control bit that was received one period earlier, and $S(n)$ represent the step size (in dB) currently used, and the step size $S(n+1)$ in response to the instruction information $C(n)$ is expressed as follows:

$$S(n+1)=P \cdot S(n) \ (P>1) \text{ if } C(n)=C(n-1)$$

$$S(n+1)=(1/Q) \cdot S(n)(Q>1) \text{ if } C(n) \neq C(n-1)$$

where P is a coefficient for increasing the step size S while Q is a coefficient for decreasing the step size S.

Unlike wire communications, radio communications may suffer a higher number of errors in transmitted information. With this method alone, an inappropriate step size may be set when an error takes place in the reception of instruction information. If the step size is set to vary each time the instruction information is received, the determination of an appropriate step size at each reception is difficult.

According to the present invention, for example, a transmission power control bit monitor monitors a change in time series of instruction information of transmission power control before the modification of step size. When the transmission power control bit as the instruction information gives the same content a predetermined number of times, the step size is increased. When the transmission power control bit gives different contents a predetermined number of times, the step size is decreased. When the instruction for the modification of the step size is given, the predetermined count is cleared. Monitoring segments are not overlapped so that the modification of the step size matching fading is performed even with an error in the transmission power control bit.

According to the present invention, for example, a transmission power control bit monitor monitors a change in time series of instruction information of transmission power control before the modification of step size. When the instruction information of a current transmission power control bit and prior bits are the same for a predetermined number of times, the step size is increased. When the instruction information of a current transmission power control bit and prior bits are different for a predetermined number of times, the step size is decreased. The monitoring segments are overlapped such that the response of the step size may not be degraded. The instruction information of 1 bit permits the step size to be appropriately and automatically modified in accordance with a variation in the received power due to fading. The detail description follows.

First Embodiment

Figure 1:
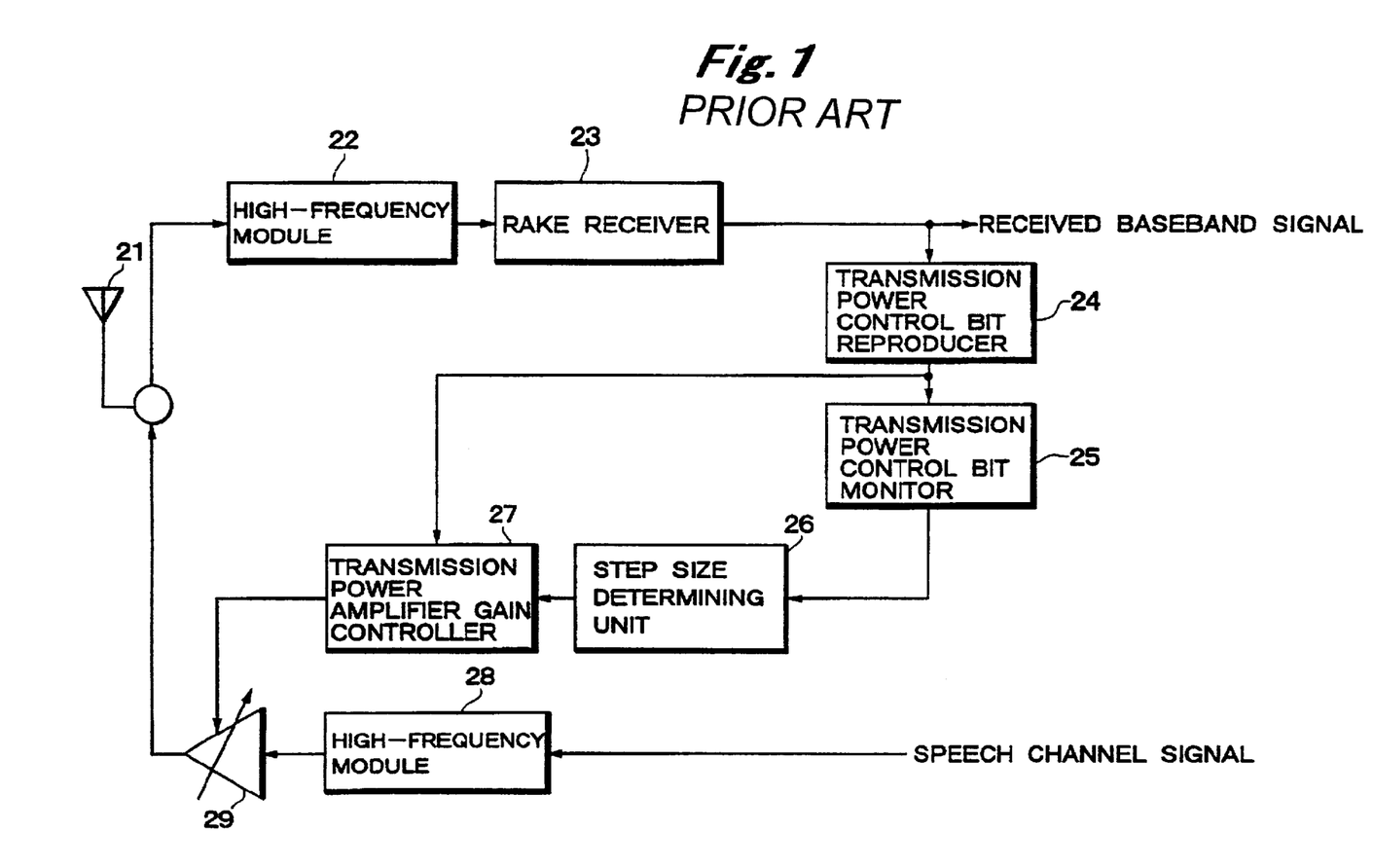
FIG. 1 illustrates a transmission power control method according to one embodiment of the present invention.

FIG. 1 illustrates a transmission power control method according to a first embodiment of the present invention in its first aspect.

There are shown a transmitting/receiving antenna 21, a high-frequency module 22 for converting a signal received from a base station into a signal in a spread band, a rake receiver 23 for decoding (despreading) the output signal of the high-frequency module 22 into a baseband signal, a transmission power control bit reproducer 24 for receiving the output signal of the rake receiver 23 to extract a transmission power control bit (instruction information) which is transmitted by the base station at regular periods, and a transmission power control bit monitor 25 which monitors the transmission power control bit and outputs a modification instruction of a step size when a certain condition is satisfied.

Also shown are a step size determining unit 26 for determining the step size based on the modification instruction of the step size output by the transmission power control bit monitor 25, a transmission power amplifier gain controller 27 for setting an power amplifier gain based on the transmission power control bit output by the transmission power control bit reproducer 24 and the step size given by the step size determining unit 26, a high-frequency module 28 for converting a speech channel signal into a radio-frequency band signal, and a variable-gain amplifier 29 for amplifying the output signal of the high-frequency module 28 and then transmitting the amplified signal from the transmitting/receiving antenna 21. The variable-gain amplifier 29 is controlled by the transmission power amplifier gain controller 27.

The operation of the first embodiment is now discussed.

The high-frequency module 22 converts a signal received by the transmitting/receiving antenna 21 into a signal in a spread band, and the rake receiver 23 decodes the output signal of the high-frequency module 22 into a baseband signal.

The transmission power control bit reproducer 24 reproduces a transmission power control bit that is transmitted by the base station every constant period Tpc (seconds), based on the signal decoded by the rake receiver 23.

The transmission power control bit monitor 25 monitors the instruction content of the transmission power control bit output by the transmission power control bit reproducer 24. If the currently input transmission power control bit C(n) is identical, in content, to the transmission power control bit C(n−1), of the previous period for M consecutive times, the transmission power control bit monitor 25 outputs an instruction to increase the step size to the step size determining unit 26. If the currently input transmission power control bit C(n) is different, in content, from the transmission power control bit C(n−1), of the previous period for N consecutively times, the transmission power control bit monitor 25 outputs an instruction to decrease the step size to the step size determining unit 26. At the moment the instruction to modify the step size is issued, and at the moment the output of the transmission power control bit is interrupted, the accumulated count of transmission power control bits is cleared, and another counting cycle starts over. The values of M and N are predetermined through simulation such that the variance of the difference between a power received at the base station and a desired power is minimized.

Represents the currently used step size S(n), and the step size determining unit 26 sets a new step size S(n+1) according to the following equations, and outputs the set step size S(n+1) to the transmission power amplifier gain controller 27.

To increase the step size, S(n+1)=P·S(n).

To decrease the step size, S(n+1)=(1/Q)·S(n)

The coefficients P and Q are determined through simulation at each frequency.

The transmission power amplifier gain controller 27 controls the variable-gain amplifier 29 so that the transmission power Pout expressed by the following equation.

$$Pout = P0 \cdot G$$

$$G = \sum_{k=1}^{n} S(k+1) C(k)$$

where P0 is an initial transmission power.

In the first embodiment, the mobile station monitors the transmission power control bit transmitted by the base station, increases the step size if the transmission power control bit remains the same in for a predetermined number of times and reduces the step size if the transmission power control bit is different in for a predetermined number of times. The count is then cleared so that one monitoring segment may not overlap another monitoring segment. When the travel speed of the mobile station is high or even when an error takes place in radio communication information, a deviation of the transmission power in the transmission power control from a desired power is reduced, and a number of users thus enjoy fair service in terms of the quality of communication.

Second Embodiment

In a second embodiment, the monitoring segments in the transmission power control bit monitor 25, are overlapped. The construction of the mobile station in the second embodiment remains unchanged from that in the first embodiment.

The operation of the second embodiment is now discussed.

The high-frequency module 22 converts a signal received by the transmitting/receiving antenna 21 into a signal in a spread band, and the rake receiver 23 decodes the output signal of the high-frequency module 22 into a baseband signal.

The transmission power control bit reproducer 24 reproduces a transmission power control bit that is transmitted by the base station every constant period Tpc (seconds), based on the signal decoded by the rake receiver 22.

If the currently input transmission power control bit C(n) is identical, in content, the transmission power control bit C(n−1) of the previous period, the transmission power control bit monitor 25 examines the past I consecutive transmission power control bits. If the past I consecutive transmission power control bits are identical to each other in content, the transmission power control bit monitor 25 issues an instruction to increase the step size to the step size determining unit 26. Specifically, C(0) represents the current transmission power control bit, and the condition C(0)=C(−1)=C(−2) . . . C(−I+1)=C(−I) will hold.

When the instruction content of the currently input transmission power control bit C(n) is different from that of the transmission power control bit C(n−1) that was input one period earlier, the transmission power control bit monitor 25 examines the past J consecutive transmission power control bits. If the past J consecutive transmission power control bits are different from each other in content, the transmission power control bit monitor 25 issues an instruction to decrease the step size to the step size determining unit 26. Specifically, C(0) represents the current transmission power control bit, and the condition C(0)≠C(−1)≠C(−2) . . . C(−J+1)≠C(−J) will hold.

One monitoring segment of the transmission power control bit has K overlap periods over a next monitoring segment (K<I, J). Even if the condition is satisfied, the transmission power control bit monitor 25 outputs no step size modification instruction to the step size determining unit 26 as long as the overlap periods of the segments becomes K or smaller. The values of I, J and K are predetermined through simulation such that the variance of the difference between a power received at the base station and a desired power is minimized.

Suppose that the condition C(0)=C(−1)=C(−2) . . . C(−I+1)=C(−I) holds with C(0) representing the current transmission power control bit and that an instruction to increase the step size is now issued to the step size determining unit 26.

Also, suppose that the condition C(1)=C(0)=C(−1) . . . C(−I+2)=C(−I+1) holds with C(1) representing the next transmission power control bit. The condition for outputting the instruction to increase the step size to the step size determining unit 26 is thus satisfied.

In this case, however, C(0), C(−1, C(−2), . . . , C(−I+2), C(−I+1) are overlapped between two monitoring segments. The transmission power control bit monitor 25 is designed not to output the instruction to increase the step size to the step size determining unit 26 until the number of overlap periods becomes K or smaller, even if the above condition is satisfied.

C(0)≠C(−1)≠C(−2) . . . C(−J+1)≠C(−J) with C(0) representing the current transmission power control bit and an instruction to decrease the step size is output to the step size determining unit 26. Also, C(1)≠C(0)≠C(−1) . . . C(−J+2)≠C(−J+1) holds with C(1) representing the next transmission power control bit. The condition for outputting the instruction to decrease the step size to the step size determining unit 26 is now satisfied.

In this case, however, C(0), C(−1), C(−2), . . . , C(−J+2), C(−J+1) are overlapped between two monitoring segments. The transmission power control bit monitor 25 is designed not to output the instruction to decrease the step size to the step size determining unit 26 until the number of overlap periods becomes K or smaller, even if the above condition is satisfied.

Since rapid rises and falls in the received power level takes place during fading, the degree of overlap is preferably increased as the step size is increased. The relationship of I and J thus satisfies I≦J.

Let S(n) represent the currently used step size S(n) (in dB), and the step size determining unit 26 sets a new step size S(n+1) according to the following equations, and outputs the set step size S(n+1) to the transmission power amplifier gain controller 27.

To increase the step size, S(n+1)=P·S(n).

To decrease the step size, S(n+1)=(1/Q)·S(n).

The coefficients P and Q are determined through simulation at each frequency.

The transmission power amplifier gain controller 27 controls the variable-gain amplifier 29 so that the transmission power is Pout expressed by the following equation.

$$Pout = P0 \cdot G$$

$$G = \sum_{k=1}^{n} S(k+1)C(k)$$

where P0 is an initial transmission power.

In the second embodiment, the mobile station monitors the transmission power control bit transmitted by the base station, increases the step size if the current and past transmission power control bits remain the same in content a predetermined number of times and reduces the step size if the current and past transmission power control bits are different in content a predetermined number of times. The monitoring segments are overlapped in a manner that no step size response is degraded. Even when the travel speed of the mobile station is high or even when an error takes place in radio communication information, a deviation of the transmission power in the transmission power control from a desired power is reduced, and a number of users thus enjoy fair service in terms of the quality of communication.

According to the present invention in its first aspect, the base station transmits, to the mobile station, the transmission power control instruction signal for controlling the transmission power of the mobile station, along with a transmission signal, at regular periods, based on the power of a received signal transmitted by the mobile station. The mobile station monitors the transmission power control instruction signal transmitted by the base station and changes the rate of modification in the transmission power, based on either the number of consecutive transmission power control instruction signals that give the same content or the number of consecutive transmission power control instruction signals that give different contents, one from another, and controls the transmission power of a signal to be transmitted, based on the transmission power control instruction signal transmitted by the base station and the changed rate of modification in the transmission power. Even when an error takes place in radio communication information, a deviation of the transmission power in the transmission power control from a desired power is reduced in response to the travel speed of the mobile station, and a number of users thus enjoy fair service in terms of the quality of communication.

Transmission power is controlled against fading in the second embodiment of the present invention in its first aspect. A fading may take place in a service area for the base station and the mobile station in a duration during which an instruction is transmitted from the base station to the mobile station. Instruction contents may get erroneous, and possibly degrade the step size response.

The principle of the present invention in its second aspect is now discussed. If the instruction content proves correct, the instruction content is thought to match the variation due to the fading taking place in the service area of the base station and the mobile station. The sum of the products of the instruction reversing the received instruction and the transmission power is computed to reproduce the fading at each moment (since the instruction received from the base station is designed to cancel the effect of the fading, the instruction reversing the received instruction is to reproduce the effect of the fading). Since the reproduced value includes erratic instructions, it cannot be fully relied upon.

The present invention in its second aspect performs a sort of smoothing operation that reflects the structure of the fading. The smoothing operation implements a linear prediction analysis. The instruction of the transmission power is estimated depending on a fading value after being smoothed and the level of the received power required at the base station. Even with an error taking place in the transmission of the instruction of transmission power, a one bit instruction is used to modify appropriately and automatically the step size matching the variations in the received power due to fading.

Third Embodiment

Figure 3:
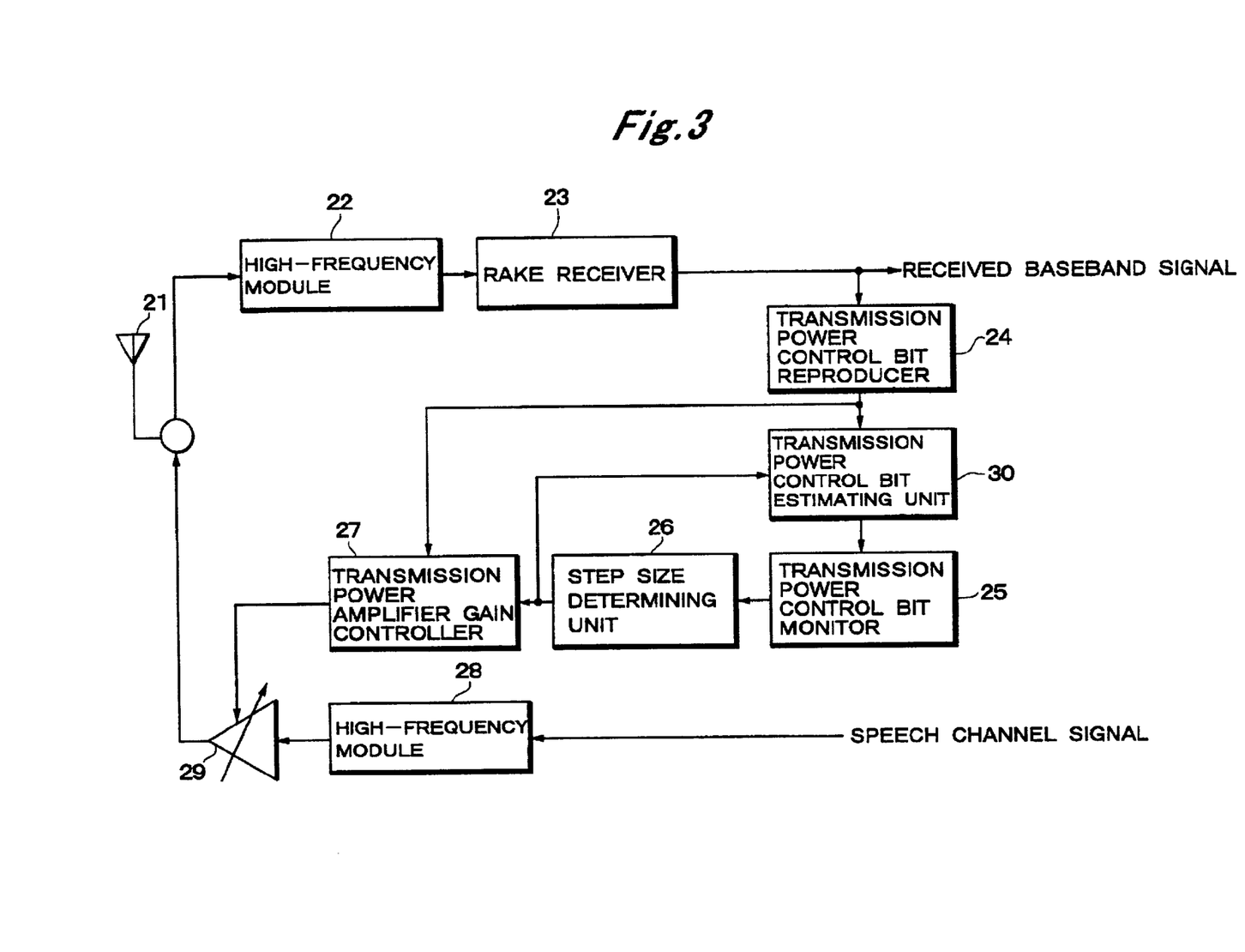
FIG. 3 illustrates a transmission power control method according to another embodiment of the present invention.

FIG. 3 is a block diagram of a mobile station that illustrates the transmission power control method of a third embodiment of the present invention in its second aspect.

Referring to FIG. 3, there are shown a transmitting/receiving antenna 21, a high-frequency module 22 for converting a signal received from a base station into a signal in a spread band, a rake receiver 23 for decoding (despreading) the output signal of the high-frequency module 22 into a baseband signal, a transmission power control bit reproducer 24 for receiving the output signal of the rake receiver 23 to extract a transmission power control bit which is transmitted by the base station at regular periods, a transmission power control bit estimating unit 30 for estimating the transmission power control bit, and a transmission power control bit monitor 25 which monitors the transmission power control bit estimated by the transmission power control bit estimating unit 30 and outputs a modification instruction of a step size when a certain condition is satisfied.

Also shown are a step size determining unit 26 for determining the step size, based on the modification instruction of the step size output by the transmission power control bit monitor 25, a transmission power amplifier gain controller 27 for determining an power amplifier gain, based on the transmission power control bit output by the transmission power control bit reproducer 24 and the step size given by the step size determining unit 26, a high-frequency module 28 for converting a speech channel signal into a radio-frequency band signal, and a variable-gain amplifier 29 for amplifying the output signal of the high-frequency module 28 and then transmitting the amplified signal from the transmitting/receiving antenna 21. The variable-gain amplifier 29 is controlled by the transmission power amplifier gain controller 27.

The operation of the third embodiment is now discussed.

The high-frequency module 22 converts a signal received by the transmitting/receiving antenna 21 into a signal in a spread band, and the rake receiver 23 decodes the output signal of the high-frequency module 22 into a baseband signal.

The transmission power control bit reproducer 24 reproduces a transmission power control bit that is transmitted by the base station every constant period Tpc (seconds), based on the signal decoded by the rake receiver 23.

The transmission power control bit estimating unit 30 examines the confidence level of the received control bit. Specifically, the received transmission power control bit is integrated to reproduce a fading that takes place in the propagation of a radio wave from the mobile station to the base station. Throughout this duration, the step size is varying. Taking into consideration the varying step size, a fading value F(i) is expressed as follows:

$$F(i) = \sum_{j=0}^{i} -S(j-D)C(j)$$

where i represents time, and j=0 represents normal start time. S(i) represents a step size determined at time i, C(i) represents a transmission power control bit received at time i, and D represents a control delay that elapses from when a transmission power control bit is transmitted at S(i) by the base station to when the corresponding transmission power control bit is received by the mobile station.

Let i0 represent present time, and the predicted value of F(i0) is now computed. The received power required by the base station with the predicted value F'(i0) (which may be reported in advance of communication) is compared with the received power and the instruction content of the transmission power control bit is estimated depending on the difference therebetween.

Now, let C'(i) represent the estimated transmission power control bit, and the instructed transmission power control bit C'(i0) estimated as below is created.

F'(i0)≧received power required by the base station: instruction content of C'(i0) is for lowering the transmission power;

F'(i0)<received power required by the base station: instruction content of C'(i0) is for raising the transmission power;

The computation of the predicted value F'(i0) against F(i) is obtained through linear prediction analysis of time series of F(i).

$$F'(iO) = \sum_{j=1}^{P} w(j)F(iO_{20}j)\ 0$$

Where P is the order of prediction, and w(j) is a coefficient of prediction. The coefficient of prediction is determined with Pe representing a prediction error as follows:

$$W = R^{31\ 1} \cdot E$$

where W=(1, w(1), w(2), . . . , w(p)), E=(Pe, 0, 0, . . . ,0). R is a matrix and its value r(m,n) at m-th row and n-th column is calculated (· represents complex conjugate).

$$r(m, n) = \sum_{i=0}^{L-1} F(iO - L + i + m)\overline{F(iO - L + i + n)}$$

where L is the number of samples of F(i) to be used in analysis retrospectively from i0. The computation of the coefficient of prediction is efficiently made using known methods (including Levinson-Durbin algorithm and Maximum Entropy algorithm).

The transmission power control bit monitor 25 examines the contents of past I transmission power control bits when the currently estimated transmission power control bit C'(n) is identical, in content, to the transmission power control bit C'(n−1) that was estimated one period earlier. When the instruction contents of the current and past control bits are identical I times, the transmission power control bit monitor 25 outputs an instruction to increase the step size to the step size determining unit 26. Specifically, C'(i0) represents the currently estimated transmission power control bit, and the condition C'(i0)=C'(i0−1)=C−(i0−2) . . . C'(i0−I+1)=C'(i0−I) will hold.

When the instruction content of the currently input transmission power control bit C'(n) is different from that of the transmission power control bit C'(n−1) that was estimated one period earlier, the transmission power control bit monitor 25 examines past J consecutive transmission power control bits. If the past J consecutive transmission power control bits are different from each other in content, the transmission power control bit monitor 25 issues an instruction to decrease the step size to the step size determining unit 26. Specifically, C'(i0) represents the current transmission power control bit, and the condition C'(i0)≠C'(i0−1)≠C'(i0−2) . . . C'(i0−J+1)≠C'(i0−J) will hold.

One monitoring segment of the transmission power control bit has K overlap periods over a next monitoring segment (K<I, J). Even if the condition is satisfied, the transmission power control bit monitor 25 outputs no step size modification instruction to the step size determining unit 26 as long as the overlap periods of the segments becomes K or smaller. The values of I, J and K are predetermined through simulation such that the variance of the difference between a power received at the base station and a desired power is minimized.

Suppose that tile condition C'(i0)=C'(i0−1)=C'(i0−2) . . . C'(i0−I+1)=C'(i0−I) holds with C'(i0) representing the currently estimated transmission power control bit and that an instruction to increase the step size is now issued to the step size determining unit 26. Also, suppose that the condition C'(i0+1)=C'(i0)=C'(i0−1) . . . C'(i0−I+2)=C'(i0−I+1) holds with C'(i0+1) representing the next estimated transmission power control bit. The condition for outputting the instruction to increase the step size to the step size determining unit 26 is thus satisfied.

In this case, however, C'(i0), C'(i0−1), C'(i0−2), . . . , C'(i0−I+2), C'(i0−I+1) are overlapped between two monitoring segments. The transmission power control bit monitor 25 is designed not to output the instruction to increase the step size to the step size determining unit 26 until the number of overlap periods becomes K or smaller, even if the above condition is satisfied.

Suppose that C'(i0)≠C'(i0−1)[|m]'C'(i0−2) . . . C'(i0−J+1)≠C'(i0−J) with C'(i0) representing the currently estimated transmission power control bit and that an instruction to decrease the step size is output to the step size determining unit 26. Also, suppose that C'(i0+1)≠C'(i0)≠C'(i0−1) . . . C'(i0−J+2)≠C'(i0−J+1) holds with C(i0+1) representing the next estimated transmission power control bit. The condition for outputting the instruction to decrease the step size to the step size determining unit 26 is now satisfied.

In this case, however, C'(i0), C'(i0−1), C'(i0−2), . . . , C'(i0−J+2), C'(i0−J+1) are overlapped between two monitoring segments. The transmission power control bit monitor 25 is designed not to output the instruction to decrease the step size to the step size determining unit 26 until the number of overlap periods becomes K or smaller, even if the above condition is satisfied.

Since rapid rises and falls in the received power level takes place during fading, the degree of overlap is preferably increased as the step size is increased. The relationship of I and J thus satisfies I≦J.

Represents the currently used step size S(n) (in dB), and the step size determining unit 26 sets a new step size S(n+1) according to the following equations, and outputs the set step size S(n+1) to the transmission power amplifier gain controller 27.

To increase the step size, S(n+1)=P·S(n).

To decrease the step size, S(n+1)=1/Q)·S(n)

The coefficients P and Q are determined through simulation at each frequency.

The transmission power amplifier gain controller 27 controls the variable-gain amplifier 29 so that the transmission power is Pout expressed by the following equation.

$$Pout = P0 \cdot G$$
$$G = \sum_{k=1}^{n} S(k+1)C(k)$$

where P0 is an initial transmission power.

In the third embodiment, the mobile station determines the predicted value of fading, estimates the transmission power control bit transmitted by the base station, and monitors the estimated transmission power control bit. The mobile station increases the step size if the number of bits, including the transmission power control bits currently estimated and estimated in the past, having identical content are a corresponding predetermined number, and decreases the step size if the number of bits, including the transmission power control bits currently estimated and estimated in the past, having different contents are a corresponding predetermined number that may or may not be the same as the previous predetermined number. The monitoring segments are overlapped in a manner that no step size response is degraded. Even when the travel speed of the mobile station is high or even when an error takes place in communicated information in radio communication, a deviation of the transmission power in the transmission power control from a desired power is reduced, and a number of users thus enjoy fair service in terms of the quality of communication.

According to the present invention in its second aspect, the base station transmits, to the mobile station, the transmission power control instruction signal for controlling the transmission power of the mobile station, along with a transmission signal, at regular periods, based on the received power of a signal transmitted by the mobile station. The mobile station monitors the transmission power control instruction signal transmitted by the base station and estimates the rate of modification in the transmission power, based on the transmission power control instruction signal transmitted by the base station and a current rate of modification in the transmission power. The mobile station monitors the estimated transmission power control instruction signal and changes the rate of modification in the transmission power, based on either the number of consecutive transmission power control instruction signals that give the same content or the number of consecutive transmission power control instruction signals that give different contents, one from another. The mobile station controls the transmission power of a signal to be transmitted, based on the transmission power control instruction signal transmitted by the base station and the changed rate of modification in the transmission power. The deviation of the transmission power in the transmission power control from a desired power is reduced in response to the travel speed of the mobile station, and a number of users thus enjoy fair service in terms of the quality of communication.

The transmission power control method of the present invention in its third aspect is now discussed.

C(n) represents the instruction of transmission power control received from a base station at a period of transmission power control (n-th period, for example), namely 1-bit information for power increase or power reduction and S(n) represent the step size (in dB) currently used, and the step size S(n+1) is expressed as follows:

$$S(n+1)=P \cdot S(n)(P>1) \text{ if } C(n)=C(n-1)$$

$$S(n+1)=(1/Q) \cdot S(n)$$

$$(Q>1) \text{ if } C(n) \neq C(n-1)$$

where P is a coefficient for increasing the step size S while Q is a coefficient for decreasing the step size S.

The optimum values of P and Q are not always constant under fading, namely, in terms of Doppler frequency. Specifically, when the Doppler frequency is low under a mild fading, a small step size is enough to track the fading, and the condition P/Q>1 is perfectly acceptable. When the Doppler frequency is high, a sharp drop is typically followed by a sharp rise in signal strength, and with the P/Q>1 held, an improved tracking performance to fading results.

Figure 5:
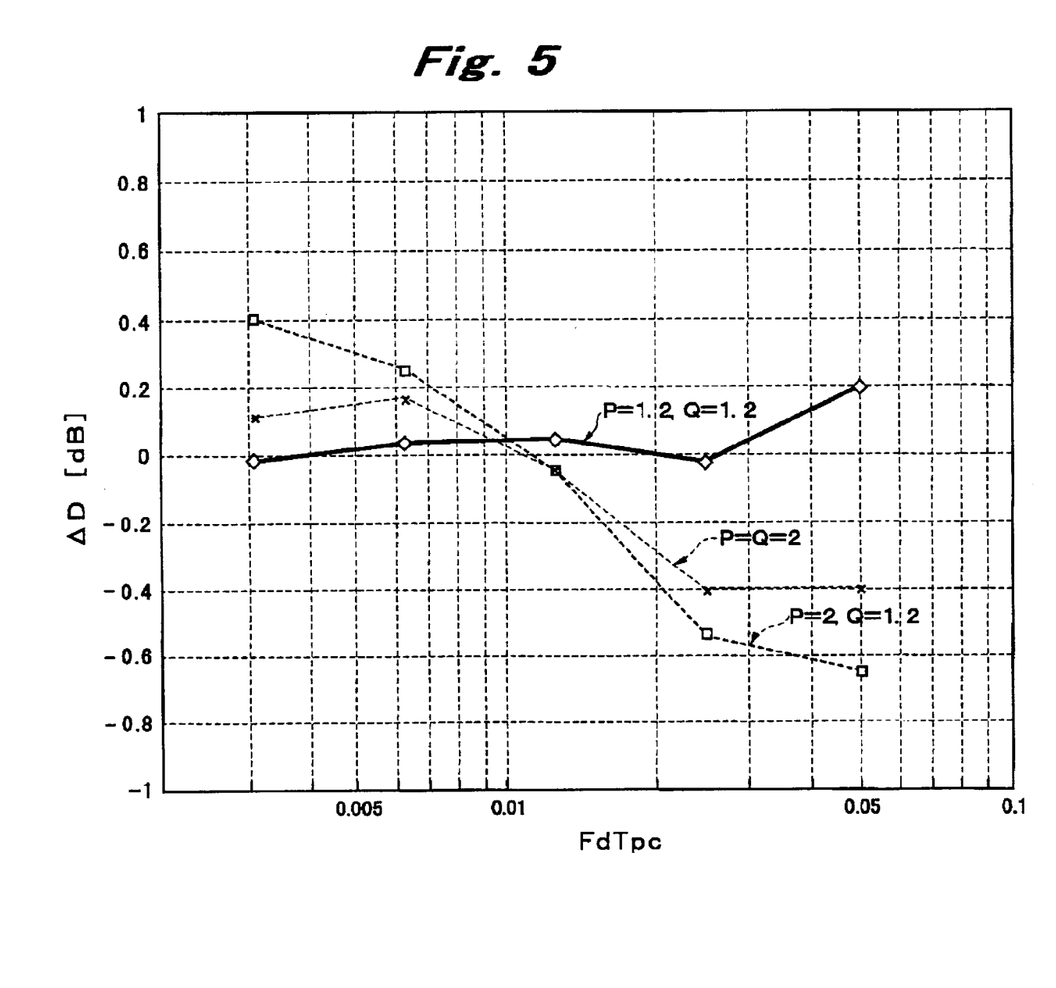
FIG. 5 illustrates a simulation result showing a variation in the standard deviation of control error due to variations in P and Q.

FIG. 5 shows the result of simulation, plotting variations in the standard deviation of control error with P and Q changed.

Referring to FIG. 5, the abscissa represents FdTpc (Fd represents a maximum Doppler frequency and Tpc represents a control period of the transmission power control, and is 0.5 ms here). As the value of FdTpc increases, the fading increases. D0 (dB) is the standard deviation D0 (dB) of control error that takes place in the conventional transmission power control, and D (dB) be the standard deviation of control error when the above-described step size control is implemented. The ordinate represents the difference ΔD=D−D0 (dB) (the smaller AD the more effective the control method of the present invention is).

FIG. 5 gives standard deviation of control error with P=1.2 and Q=2 with the condition P/Q<1, P=2 and Q=1.2 with the condition P/Q>1, and P=Q=2 with P/Q=1.

Referring to FIG. 5, the condition P/Q<1 preferably holds when the maximum Doppler frequency is low, and the condition P/Q>1 preferably holds when the maximum Doppler frequency is high.

In the present invention in its third aspect, contraction and expansion coefficients (coefficients P and Q) are appropriately set by computing the maximum Doppler frequency when the Jayant method is used in the transmission power control. In the estimation of the Doppler frequency, the instruction about the transmission power received from the base station may be used to control an increase in the amount of computation. This is because a series of such instructions reflect the state of fading. By tracing back the history of instructions and step sizes corresponding to the instructions, the fading may be reproduced by the mobile station. The Doppler frequency is thus estimated referring to the number of crossings across a reference level within a predetermined time. This process is discussed below.

Fourth Embodiment

Figure 4:
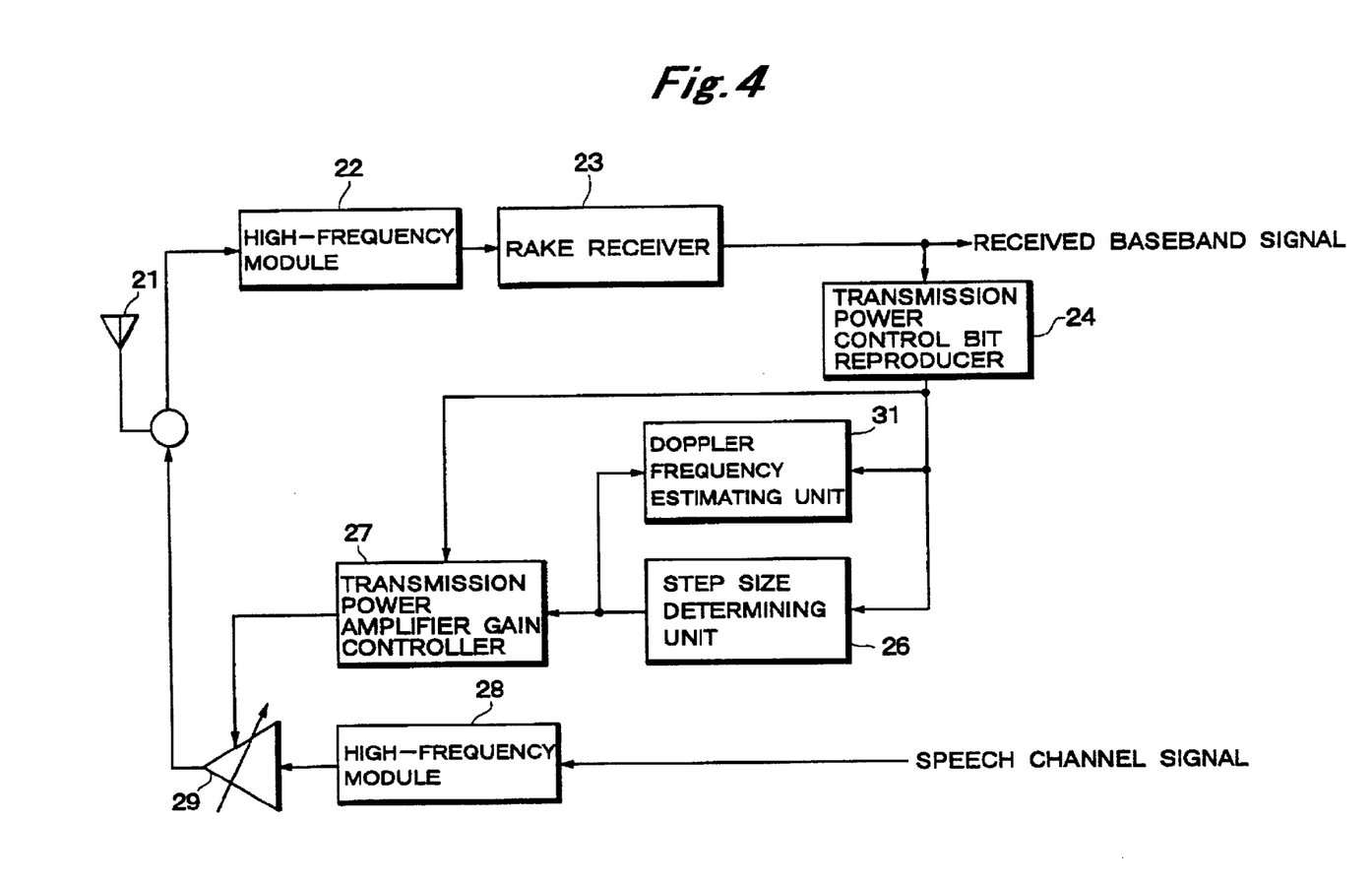
FIG. 4 illustrates a transmission power control method according to yet another embodiment of the present invention.

FIG. 4 is a block diagram of a mobile station, showing the transmission power control according to a fourth embodiment of the present invention.

Referring to FIG. 4, there are shown a transmitting/receiving antenna 21, a high-frequency module 22 for converting a signal received from a base station into a signal in a spread band, a rake receiver 23 for decoding the output signal of the high-frequency module 22 into a baseband signal, and a transmission power control bit reproducer 24 for receiving the output signal of the rake receiver 23 to extract a transmission power control bit which is transmitted by the base station at regular periods. The resulting transmission power control bit is fed to the step size determining unit 26 and a Doppler frequency estimating unit 31.

Also shown are a step size determining unit 26 for determining the step size, based on the time series of the transmission power control bits and the estimated Doppler frequency, the Doppler frequency estimating unit 31 for estimating the Doppler frequency, based on the past value of step size and the time series of the transmission power control bits, a transmission power amplifier gain controller 27 for determining an power amplifier gain, based on the transmission power control bit output by the transmission power control bit reproducer 24 and the step size given by the step size determining unit 26, a high-frequency module 28 for converting a speech channel signal into a radio-frequency band signal, and a variable-gain amplifier 29 for amplifying the output signal of the high-frequency module 28 and then transmitting the amplified signal from the transmitting/receiving antenna 21. The variable-gain amplifier 29 is controlled by the transmission power amplifier gain controller 27.

The operation of the fourth embodiment is now discussed.

The high-frequency module 22 converts a signal received by the transmitting/receiving antenna 21 into a signal in a spread band, and the rake receiver 23 decodes the output signal of the high-frequency module 22 into a baseband signal.

The transmission power control bit reproducer 24 reproduces a transmission power control bit that is transmitted by the base station every constant period Tpc (seconds), based on the signal decoded by the rake receiver 23.

The step size determining unit 26 determines the step size, based on the Doppler frequency Festimate estimated by the Doppler frequency estimating unit 31 and the transmission power control bit extracted by the transmission power control bit reproducer 24.

The determination of the step size by the step size determining unit 26 is now discussed.

C(n) represents the instruction of transmission power control received from a base station at a period of transmission power control (n-th period, for example), namely 1-bit information for power increase or power reduction (for convenience, −1 represents transmission power increase while +1 represents transmission power reduction), C(n−1) represents the instruction information of the transmission power control bit that was received one period earlier, and S(n) represents the step size (in dB) currently used, and the step size S(n+1) is expressed as follows:

$$S(n+1)=P \cdot S(n)(P>1) \text{ if } C(n)=C(n-1)$$

$$S(n+1)=(1/Q) \cdot S(n)(Q>1) \text{ if } C(n) \neq C(n-1)$$

The contraction and expansion coefficients P and Q are found in tables, Ptable (Festimate) and Qtable (Festimate), which are created in advance based on Festimate.

Specifically, using the simulation result shown in FIG. 5, the following coefficients, for example, may be employed:

P=1.2, Q=2 for Festimate≦0.009

P=Q=2 for 0.009≦Festimate≦0.012

P=2, Q=1.2 for 0.012≦Festimate

According to the following equation, the Doppler frequency estimating unit 31 reproduces the fading F(−i) using the transmission power control period for reproducing a fading in past time of Test (seconds), based on the step size and the time series of the transmission power control bits, created prior to the current transmission power control period.

$$F(-i) = \sum_{j=0}^{i} -S(-j-D)C(-j) \; 0$$

where j=0 is the time at which the reception of the transmission power control bit starts, S(i) is a step size determined at time i, C(i) is a transmission power control bit received at time i, and D represents a control delay that elapses from when a transmission power control bit is transmitted at S(i) by the base station to when the corresponding transmission power control bit is received by the mobile station.

The average Fav of F(−i) is computed during the past time Test (seconds). Specifically, Fav is computed from F(i) (i=1 through L) of L=Test/Td, where Td is a transmission power control period. Durations throughout which F(i) remains high above Fav are averaged to obtain an average Tav. This value is thought to represent typical increase and decrease in an observation time, and is regarded as a dominant fading frequency in a segment of interest. The Doppler frequency Festimate is estimated according to the following equation.

$$\text{Festimate}=(\frac{1}{4}) \cdot (1/\text{Tav})$$

In this equation, the coefficient ¼ is determined as follows. If the shortest period is considered half the longest period, the period of variation is 2Tav. The fading frequency is approximated to be half the period of variation in the received power. This establishes the relationship of 2Festimate=½Tav.

The transmission power amplifier gain controller 27 controls the variable-gain amplifier 29 so that the transmission power is Pout expressed by the following equation.

$$Pout = P0 \cdot G$$

$$G = \sum_{k=1}^{n} S(k+1)C(k)$$

where P0 is an initial transmission power.

Referring to the simulation result shown in FIG. 5, a control closest to the transmission power control having the smallest ΔD in accordance with FdTpc is performed.

According to the present invention in its third aspect, the base station transmits, to the mobile station, the transmission power control instruction signal for controlling the transmission power of the mobile station, along with a transmission signal, at regular periods, based on the received power of a signal transmitted by the mobile station. The mobile station estimates the Doppler frequency the received signal is subject to under fading, based on the transmission power control instruction signal transmitted by the base station and a current rate of modification in the transmission power. The mobile station changes the rate of modification in the transmission power, based on the estimated Doppler frequency and the transmission power control instruction signal. The mobile station controls the transmission power of a signal to be transmitted, based on the transmission power control instruction signal transmitted by the base station and the changed rate of modification in the transmission power. The deviation of the transmission power in the transmission power control from a desired power is reduced in response to the travel speed of the mobile station, and a number of users thus enjoy fair service in terms of the quality of communication.

What is claimed is:

1. A transmission power control method in a radio communications system for communication between a base station and a mobile station, said method comprising:

said base station detecting a received power of a signal transmitted by said mobile station and transmitting, to said mobile station, a transmission power control instruction signal to control the transmission power of said mobile station, along with a transmission signal, at regular periods;

said mobile station monitoring the transmission power control instruction signal transmitted by said base station and changing the rate of modification in the transmission power based on a setting of a number of consecutive transmission power control instruction signals that have different contents; and said mobile station controlling the transmission power of a signal to be transmitted based on the transmission power control instruction signal transmitted by said base station and the changed rate of modification in the transmission power.

2. A transmission power control method according to claim 1, further comprising:

said mobile station monitoring the transmission power control instruction signal transmitted by said base station and counting the number of consecutive transmission power control instruction signals that have different contents;

said mobile station decreasing the rate of modification in the transmission power when a count of the number of consecutive transmission power control instruction signals that have different contents is equal to a predetermined number;

said mobile station resetting the count of the number of consecutive transmission power control instruction signals that have different contents when said mobile station changes the rate of modification in the transmission power; and said mobile station controlling the transmission power of a signal to be transmitted based on the transmission power control instruction signal transmitted by said base station and the changed rate of modification in the transmission power.

3. A transmission power control method in a radio communications system for communication between a base station and a mobile station, said method comprising:

said base station detecting a received power of a signal transmitted by said mobile station and transmitting, to said mobile station, a transmission power control instruction signal to control the transmission power of said mobile station, along with a transmission signal, at regular periods;

said mobile station monitoring the transmission power control instruction signal transmitted by said base station and counting the number of consecutive transmission power control instruction signals that have the same content;

said mobile station increasing the rate of modification in the transmission power when a count of the number of consecutive transmission power control instruction signals that have the same content is equal to a predetermined number;

said mobile station resetting the count of the number of consecutive transmission power control instruction signals that have the same content whenever said mobile station changes the rate of modification in the transmission power; and said mobile station controlling the transmission power of a signal to be transmitted based on the transmission power control instruction signal transmitted by said base station and the changed rate of modification in the transmission power.

4. A transmission power control method in a radio communications system for communication between a base station and a mobile station, wherein said base station detects a received power of a signal transmitted by said mobile station and transmits, to said mobile station, a transmission power control instruction signal for controlling the transmission power of said mobile station, along with a transmission signal, at regular periods;

said mobile station monitors the transmission power control instruction signal transmitted by said base station, and increases the current rate of modification in the transmission power when the currently received transmission power control instruction signal is identical, in content, to a predetermined number of transmission power control instruction signals received prior to the currently received transmission control instruction signal and when the number of transmission power control instruction signals used to set the current rate of modification in the transmission power is equal to or smaller than a preset number, and decreases the current rate of modification in the transmission power when the currently received transmission power control instruction signal is different, in content, from a predetermined number of transmission power control instruction signals received prior to the currently received transmission control instruction signal and when the number of transmission power control instruction signals used to set the current rate of modification in the transmission power is equal to or smaller than a preset number; and said mobile station controls the transmission power of a signal to be transmitted, based on the transmission power control instruction signal transmitted by said base station and the changed rate of modification in the transmission power.

5. A transmission power control method in a radio communications system for communication between a base station and a mobile station, wherein said base station detects a received power of a signal transmitted by said mobile station and transmits, to said mobile station, a transmission power control instruction signal for controlling the transmission power of said mobile station, along with a transmission signal, at regular periods;

said mobile station estimates the transmission power control instruction signal, based on the transmission power control instruction signal transmitted by said base station and a current rate of modification in the transmission power;

said mobile station monitors the estimated transmission power control instruction signal and changes the rate of modification in the transmission power, based on either a setting of the number of consecutive transmission power control instruction signals that give the same content or a setting of the number of consecutive transmission power control instruction signals that give different contents, one from another;

said mobile station controls the transmission power of a signal to be transmitted, based on the transmission power control instruction signal transmitted by said base station and the changed rate of modification in the transmission power.

6. A transmission power control method according to claim 5, wherein a reproduced value of fading is computed through the computation of the sum of products of the transmission power control instruction signal transmitted by said base station and a current rate of modification in the transmission power and a predicted value of fading is then computed through prediction analysis of said reproduced value, and the transmission power control instruction signal is estimated depending on whether the gradient of the predicted value of fading is positive or negative.

7. A transmission power control method in a radio communications system for communication between a base station and a mobile station, wherein said base station detects a received power of a signal transmitted by said mobile station and transmits, to said mobile station, a transmission power control instruction signal for controlling the transmission power of said mobile station, along with a transmission signal, at regular periods;

said mobile station estimates the transmission power control instruction signal, based on the transmission power control instruction signal transmitted by said base station and a current rate of modification in the transmission power;

said mobile station monitors the estimated transmission power control instruction signal and increases the current rate of modification in the transmission power when the currently estimated transmission power control instruction signal is identical, in content, to a predetermined number of transmission power control instruction signals estimated prior to the currently estimated transmission control instruction signal and when the number of estimated transmission power control instruction signals used to set the current rate of modification in the transmission power is equal to or smaller than a preset number, and decreases the current rate of modification in the transmission power when the currently estimated transmission power control instruction signal is different, in content, from a predetermined number of transmission power control instruction signals estimated prior to the currently estimated transmission control instruction signal and when the number of estimated transmission power control instruction signals used to set the current rate of modification in the transmission power is equal to or smaller than a preset number; and said mobile station controls the transmission power of a signal to be transmitted, based on the transmission power control instruction signal transmitted by said base station and the changed rate of modification in the transmission power.

8. A transmission power control method according to claim 7, wherein a reproduced value of fading is computed through the computation of the sum of products of the transmission power control instruction signal transmitted by said base station and a current rate of modification in the transmission power and a predicted value of fading is then computed through prediction analysis of said reproduced value, and the transmission power control instruction signal is estimated depending on whether the gradient of the predicted value of fading is positive or negative.

9. A transmission power control method in a radio communications system for communication between a base station and a mobile station, wherein said base station detects a received power of a signal transmitted by said mobile station and transmits, to said mobile station, a transmission power control instruction signal for controlling the transmission power of said mobile station, along with a transmission signal, at regular periods;

said mobile station estimates a Doppler frequency to which the received signal is subject to under fading, based on the transmission power control instruction signal transmitted by said base station and a current rate of modification in the transmission power;

said mobile station changes a rate of modification in the transmission power, based on the estimated Doppler frequency and the transmission power control instruction signal; and said mobile station controls the transmission power of a signal to be transmitted, based on the transmission power control instruction signal transmitted by said base station and the changed rate of modification in the transmission power.

10. A transmission power control method according to claim 9, wherein a reproduced value of fading is computed through the computation of the sum of products of the transmission power control instruction signal transmitted by said base station and a current rate of modification in the transmission power and durations of time, during which the reproduced value of fading is continuously above the average of the reproduced value of fading, are averaged, and the Doppler frequency is estimated, based on the average duration of time.

11. A transmission power control method in a radio communications system for communication between a base station and a mobile station, wherein said base station detects a received power of a signal transmitted by said mobile station and transmits, to said mobile station, a transmission power control instruction signal for controlling the transmission power of said mobile station, along with a transmission signal, at regular period;

said mobile station estimates a Doppler frequency to which the received signal is subject to under fading, based on the transmission power control instruction signal transmitted by said base station and a current rate of modification in the transmission power;

said mobile station increases the rate of modification in the transmission power when the transmission power control instruction signal transmitted by said base station is identical, in content, to the transmission power control instruction signal transmitted by said base station by one period earlier, and decreases the rate of modification in the transmission power when the transmission power control instruction signal transmitted by said base station is different, in content, from the transmission power control instruction signal transmitted by said base station by one period earlier;

said mobile station corrects the changed rate of modification, based on the estimated Doppler frequency and the transmission power control instruction signal; and said mobile station controls the transmission power of a signal to be transmitted, based on the transmission power control instruction signal and the corrected rate of modification in the transmission power.

12. A transmission power control method according to claim 11, wherein a reproduced value of fading is computed through the computation of the sum of products of the transmission power control instruction signal transmitted by said base station and a current rate of modification in the transmission power and durations of time, during which the reproduced value of fading is continuously above the average of the reproduced value of fading, are averaged, and the Doppler frequency is estimated, based on the average duration of time.

13. A transmission power control method in a radio communications system for communication between a base station and a mobile station, said method comprising:

said base station detecting a received power of a signal transmitted by said mobile station and transmitting, to said mobile station, a transmission power control instruction signal for controlling the transmission power of said mobile station, along with a transmission signal, at regular periods;

said mobile station estimating a Doppler frequency to which the received signal is subject to under fading based on the transmission power control instruction signal transmitted by said base station and a current rate of modification in the transmission power;

said mobile station increasing the rate of modification in the transmission power when the transmission power control instruction signal transmitted by said base station is identical in content to the transmission power control instruction signal transmitted by said base station one period earlier;

said mobile station correcting the changed rate of modification based on the estimated Doppler frequency and the transmission power control instruction signal; and said mobile station controlling the transmission power of a signal to be transmitted based on the transmission power control instruction signal and the corrected rate of modification in the transmission power.

14. A transmission power control method according to claim 13, further comprising:

computing a reproduced value of fading through the computation of the sum of products of the transmission power control instruction signal transmitted by said base station and averaging a current rate of modification in the transmission power and durations of time, during which the reproduced value of fading is continuously above the average of the reproduced value of fading; and estimating the Doppler frequency based on the average durations of time.

15. A transmission power control method in a radio communications system for communication between a base station and a mobile station, said method comprising:

said base station detecting a received power of a signal transmitted by said mobile station and transmitting, to said mobile station, a transmission power control instruction signal for controlling the transmission power of said mobile station, along with a transmission signal, at regular periods;

said mobile station estimating a Doppler frequency to which the received signal is subject to under fading based on the transmission power control instruction signal transmitted by said base station and a current rate of modification in the transmission power;

said mobile station decreasing the rate of modification in the transmission power when the transmission power control instruction signal transmitted by said base station is different in content from the transmission power control instruction signal transmitted by said base station one period earlier;

said mobile station correcting the changed rate of modification based on the estimated Doppler frequency and the transmission power control instruction signal; and said mobile station controlling the transmission power of a signal to be transmitted based on the transmission power control instruction signal and the corrected rate of modification in the transmission power.

16. A transmission power control method according to claim 15, further comprising:

computing a reproduced value of fading through the computation of the sum of products of the transmission power control instruction signal transmitted by said base station and averaging a current rate of modification in the transmission power and durations of time, during which the reproduced value of fading is continuously above the average of the reproduced value of fading; and estimating the Doppler frequency based on the average durations of time.

17. A transmission power control method in a radio communications system, said method, performed by a mobile station, comprising:

receiving a transmission power control instruction signal to control the transmission power of said mobile station, along with a transmission signal, at regular periods;

monitoring the received transmission power control instruction signals, increasing a current rate of modification in the transmission power when the currently received transmission power control instruction signal is identical in content to a predetermined number of transmission power control instruction signals received prior to the currently received transmission control instruction signal and when the number of transmission power control instruction signals used to set the current rate of modification in the transmission power is equal to or smaller than a predetermined number, and decreasing the current rate of modification in the transmission power when the currently received transmission power control instruction signal is different in content from a predetermined number of transmission power control instruction signals received prior to the currently received transmission control instruction signal and when the number of transmission power control instruction signals used to set the current rate of modification in the transmission power is equal to or smaller than another predetermined number; and controlling the transmission power of a signal to be transmitted based on the transmission power control instruction signal transmitted by said base station and the changed rate of modification in the transmission power.

18. A transmission power control method in a radio communications system, said method, performed by a mobile station, comprising:

receiving a transmission power control instruction signal to control the transmission power of said mobile station, along with a transmission signal, at regular periods;

estimating the transmission power control instruction signal based on the received transmission power control instruction signal and a current rate of modification in the transmission power;

monitoring the estimated transmission power control instruction signal and changing the rate of modification in the transmission power based on either a setting of the number of consecutive transmission power control instruction signals that have the same content or a setting of the number of consecutive transmission power control instruction signals that have different contents; and controlling the transmission power of a signal to be transmitted based on the transmission power control instruction signal transmitted by said base station and the changed rate of modification in the transmission power.

19. A transmission power control method according to claim 18, further comprising:

computing a reproduced value of fading through the computation of the sum of products of the received transmission power control instruction signals and a current rate of modification in the transmission power;

computing a predicted value of fading through prediction analysis of said reproduced value; and estimating the transmission power control instruction signal depending on whether the gradient of the predicted value of fading is positive or negative.

20. A transmission power control method in a radio communications system, said method, performed by a mobile station, comprising;

receiving a transmission power control instruction signal to control the transmission power of said mobile station, along with a transmission signal, at regular periods;

estimating the transmission power control instruction signal based on the received transmission power control instruction signals and a current rate of modification in the transmission power;

monitoring the estimated transmission power control instruction signal, increasing the current rate of modification in the transmission power when the currently estimated transmission power control instruction signal is identical in content to a predetermined number of transmission power control instruction signals estimated prior to the currently estimated transmission control instruction signal and when the number of estimated transmission power control instruction signals used to set the current rate of modification in the transmission power is equal to or smaller than a predetermined number, and decreasing the current rate of modification in the transmission power when the currently estimated transmission power control instruction signal is different in content from a predetermined number of transmission power control instruction signals estimated prior to the currently estimated transmission control instruction signal and when the number of estimated transmission power control instruction signals used to set the current rate of modification in the transmission power is equal to or smaller than another predetermined number; and controlling the transmission power of a signal to be transmitted based on the received transmission power control instruction signals and the changed rate of modification in the transmission power.

21. A transmission power control method according to claim 20, further comprising:

computing a reproduced value of fading through the computation of the sum of products of the received transmission power control instruction signals and a current rate of modification in the transmission power;

computing a predicted value of fading through prediction analysis of said reproduced value; and estimating the transmission power control instruction signal depending on whether the gradient of the predicted value of fading is positive or negative.

22. A transmission power control method in a radio communications system, said method, performed by a mobile station, comprising:

receiving a transmission power control instruction signal to control the transmission power of said mobile station, along with a transmission signal, at regular periods;

estimating a Doppler frequency to which the received signal is subject to under fading based on the received transmission power control instruction signals and a current rate of modification in the transmission power;

changing a rate of modification in the transmission power based on the estimated Doppler frequency and the transmission power control instruction signal; and controlling the transmission power of a signal to be transmitted based on the received transmission power control instruction signals and the changed rate of modification in the transmission power.

23. A transmission power control method according to claim 22, further comprising:

computing a reproduced value of fading through the computation of the sum of products of the received transmission power control instruction signals and averaging a current rate of modification in the transmission power and durations of time, during which the reproduced value of fading is continuously above the average of the reproduced value of fading; and estimating the Doppler frequency based on the average duration of time.

24. A transmission power control method in a radio communications system, said method, performed by a mobile station, comprising:

receiving a transmission power control instruction signal to control the transmission power of said mobile station, along with a transmission signal, at regular periods;

estimating a Doppler frequency to which the received signal is subject to under fading based on the received transmission power control instruction signals and a current rate of modification in the transmission power;

increasing the rate of modification in the transmission power when the received transmission power control instruction signal is identical in content to the transmission power control instruction signal received one period earlier, and decreasing the rate of modification in the transmission power when the received transmission power control instruction signal is different in content from the transmission power control instruction signal received one period earlier;

correcting the changed rate of modification, based on the estimated Doppler frequency and the transmission power control instruction signal; and controlling the transmission power of a signal to be transmitted based on the transmission power control instruction signal and the corrected rate of modification in the transmission power.

25. A transmission power control method according to claim 24, further comprising:

computing a reproduced value of fading through the computation of the sum of products of the received transmission power control instruction signals and averaging a current rate of modification in the transmission power and durations of time, during which the reproduced value of fading is continuously above the average of the reproduced value of fading; and estimating the Doppler frequency based on the average durations of time.

* * * * *